United States Patent
Gerasimov

(10) Patent No.: US 7,077,158 B2
(45) Date of Patent: Jul. 18, 2006

(54) VELOCITY HEAD COMPENSATED VALVE ASSEMBLY

(75) Inventor: Yuri Vladimirovich Gerasimov, Randolph, NJ (US)

(73) Assignee: Valcor Engineering Corporation, Springfield, NJ (US)

( * ) Notice: Subject to any disclaimer, the term of this patent is extended or adjusted under 35 U.S.C. 154(b) by 119 days.

(21) Appl. No.: 10/391,304

(22) Filed: Mar. 18, 2003

(65) Prior Publication Data

US 2004/0182445 A1  Sep. 23, 2004

(51) Int. Cl.
*G05D 16/10* (2006.01)

(52) U.S. Cl. .......................... 137/505.18; 137/505.26; 137/508

(58) Field of Classification Search ........... 137/505.18, 137/505.26, 505.45, 508
See application file for complete search history.

(56) References Cited

U.S. PATENT DOCUMENTS

| | | | |
|---|---|---|---|
| 2,777,458 A * | 1/1957 | Stern ..................... | 137/505.18 |
| 2,888,033 A * | 5/1959 | Eickmeyer ................. | 137/505 |
| 3,215,236 A | 11/1965 | Pensa ........................ | 192/85 |
| 3,276,470 A | 10/1966 | Griffing ................. | 137/505.15 |
| 3,583,431 A | 6/1971 | Diel ........................... | 137/474 |
| 3,586,033 A | 6/1971 | Hieber ....................... | 137/220 |
| 3,664,634 A | 5/1972 | Guertin et al. ............. | 251/333 |
| 3,750,693 A * | 8/1973 | Hardison .................... | 137/219 |
| 4,092,998 A * | 6/1978 | Taplin ........................ | 137/508 |
| 4,447,040 A | 5/1984 | Magorien ................. | 251/149.8 |
| 4,485,844 A | 12/1984 | Vander Kaay et al. ... | 137/515.7 |
| 4,696,162 A | 9/1987 | Williams ..................... | 60/433 |
| 4,742,846 A | 5/1988 | DiBartolo ................. | 137/514.5 |
| 5,050,636 A | 9/1991 | Sagawa et al. ............. | 137/494 |
| 5,129,419 A | 7/1992 | Stapleton ................. | 137/514.3 |
| 5,381,823 A | 1/1995 | DiBartolo ................. | 137/494 |
| 6,053,192 A * | 4/2000 | Ellzey ................... | 137/505.18 |
| 6,286,880 B1 | 9/2001 | Pratt ........................ | 294/68.25 |
| 6,295,975 B1 | 10/2001 | Yew et al. ............... | 123/568.2 |

* cited by examiner

*Primary Examiner*—Stephen M. Hepperle
(74) *Attorney, Agent, or Firm*—Taylor & Aust, P.C.; Paul C. Gosnell

(57) ABSTRACT

A valve assembly includes a valve body configured to define a chamber forming a primary flowpath between an inlet port and a discharge port, an isolator disposed inside said chamber, and a poppet having a bore. The isolator is defined by a skirt and a stem, with the stem coupled to the valve body, and the skirt affixed to the stem. The poppet is disposed inside the chamber, and the bore is slidably received over the skirt. The isolator is configured to guide the poppet relative to the valve body, and the skirt is configured to shield the bore and isolate the poppet from substantially all of a dynamic pressure component of pressurized fluid when pressurized fluid flows from the inlet port past a portion of the poppet and then through the discharge port of the valve assembly.

8 Claims, 5 Drawing Sheets

VELOCITY HEAD COMPENSATED VALVE ASSEMBLY

BACKGROUND OF THE INVENTION

1. Field of the Invention

The present invention relates to a pressurized fluid system, and, more particularly, to a valve assembly for controlling a discharge of a pressurized fluid using a poppet.

2. Description of the Related Art

Poppet valves are used in various aerospace applications, such as gas turbine engines, rocket engines, thrusters, aerospace vehicle fuel, environmental, and cooling systems, hydraulic and pneumatic systems, and various other aerospace vehicle systems. A poppet valve may be used as a pressure regulator, a relief valve, or a bleed valve. Poppet valves include a poppet that is used to control flow through the valve or pressure at the valve assembly's inlet port or discharge port, and may also include a piston for operating or assisting to operate the poppet. The poppet controls the flow by moving closer to or further from a valve seat, and can engage and contact the valve seat in order to selectively regulate, allow, or disallow flow through the valve. Preferably, the valve is actuated by the static pressure of the fluid exposed to or passing through the valve.

In a pressure regulator, the valve is used to regulate pressure or flow from a pressurized source in order to control the pressure or flow to or through some device. The regulator valve is normally open, allowing fluid to flow through the valve, with the flow rate and pressure dependent upon the pressure at the valve's discharge port and/or some reference pressure.

Generally, during the operation of a typical valve, especially at high pressure ratios across the valve, the flow of fluid has a high velocity, yielding high dynamic pressure components, otherwise known as velocity head components, especially in vicinity of the poppet seal and valve seat that are located in the primary flowpath through the valve, and are immersed in and contact and valve/regulate the flow through the valve primary flowpath (as opposed to the piston, for example, which, although it controls or helps to control the poppet position, it is not in the primary flowpath, and does not itself contact or valve or regulate the flow). The dynamic pressure components of the flow acting on the poppet cause changes in the pressure distribution on the poppet's operative pressure-acting faces, effecting skewed results and/or measurable inaccuracies in the regulation of pressure or flow through the valve. In addition, high dynamic pressure components can change the force balance internal to the valve, i.e., by acting on the poppet in addition to or in contravention to the intended action of the fluid's static pressure acting on the poppet, thus requiring additional force to open or close the valve and causing hysteresis, depending on the flow rate.

These adverse effects are exaggerated when high flow rates are involved, yielding a dynamic pressure component approaching fifty percent of the pressurized source's total pressure.

What is needed in the art is valve that is configured such that the poppet is isolated from the dynamic pressure or velocity head components of the flow stream passing through the valve to thereby eliminate the adverse effects associated with the dynamic pressure components of flow through the valve.

SUMMARY OF THE INVENTION

The present invention provides an isolator configured to isolate a poppet in a valve assembly from a dynamic pressure component of pressurized fluid when the pressurized fluid flows from the inlet port past a portion of the poppet and then through the discharge port.

The invention, in one form thereof, is directed to a valve assembly for controlling a discharge of the pressurized fluid. The valve assembly includes a valve body configured to define a chamber forming a primary flowpath between an inlet port and a discharge port, an isolator disposed inside the chamber, and a poppet having a bore. The isolator is defined by a skirt and a stem, with the stem coupled to the valve body, and the skirt affixed to the stem. The poppet is disposed inside the chamber, and the poppet is slidably received over the skirt via the bore. The isolator is configured to guide the poppet relative to the valve body, and the skirt is configured to shield the bore and isolate the poppet from substantially all of a dynamic pressure component of pressurized fluid when pressurized fluid flows from the inlet port past a portion of the poppet and then through-the discharge port.

In another form thereof, the invention is directed to a pressurized fluid system. The pressurized fluid system includes a pressurized fluid, a pressurizing device for pressurizing the pressurized fluid, a pressure sink having a sink pressure lower than the pressure of the pressurized fluid, and a valve assembly for controlling a discharge of the pressurized fluid to the pressure sink. The valve assembly includes a valve body configured to define a chamber forming a primary flowpath between an inlet port and a discharge port, an isolator disposed inside the chamber and a poppet having a bore. The isolator is defined by a skirt and a stem, with the stem coupled to the valve body, and the skirt affixed to the stem. The poppet is disposed inside the chamber, and the poppet is slidably received over the skirt via the bore. The isolator is configured to guide the poppet relative to the valve body, and the skirt is configured to shield the bore and isolate the poppet from substantially all of a dynamic pressure component of the pressurized fluid when the pressurized fluid flows from the inlet port past a portion of the poppet and then through the discharge port into the pressure sink.

An advantage of the present invention is the ability to isolate the poppet from the dynamic pressure or velocity head components of the flow stream passing through the valve, thus reducing hysteresis and instability, and improving predictability and accuracy of valve performance.

Another advantage is the ability to isolate the poppet in an inlet pressure balanced valve, whether the valve is inlet pressure balanced by virtue of having a poppet with essentially zero effective surface area exposed to pressure at the inlet port, or whether the valve is inlet pressure balanced by virtue of a piston having an effective surface area the same as the poppet effective surface area, where the pressure acts on the piston effective surface area in a direction opposite to the action of the pressure on the poppet effective surface area.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
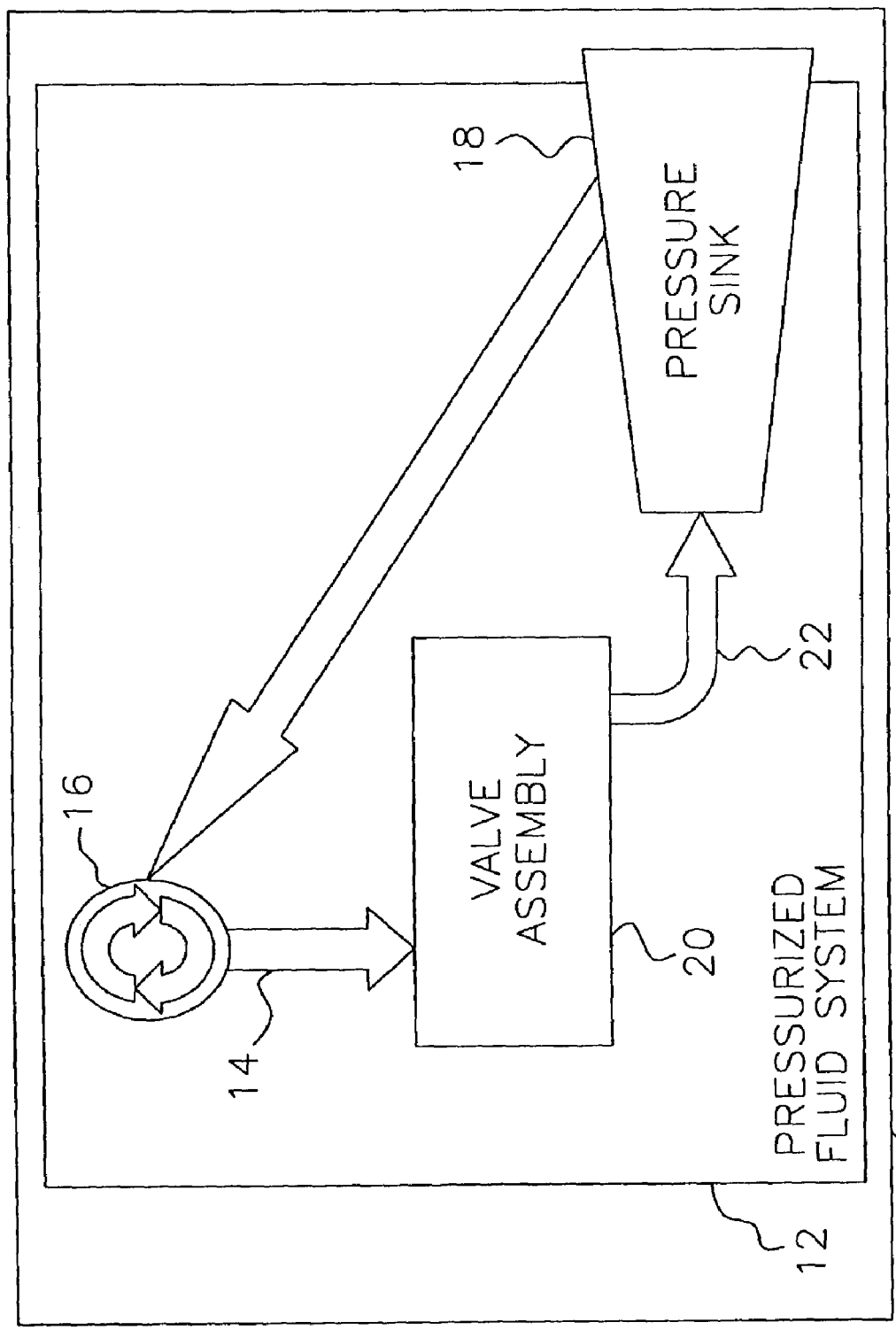
FIG. 1 is a diagrammatic representation of aerospace vehicle in which the present invention might be utilized.

Referring now to the drawings, and more particularly to FIG. 1, there is shown an aerospace vehicle 10, such as an aircraft, a rocket, a spacecraft, or a space station. Aerospace vehicle 10 includes a pressurized fluid system 12, such as a propulsion system, a fuel system, a hydraulic, pneumatic, or lube system, or any pressurized fluid system using a fluid such as air, or any gas or liquid for performing work.

Pressurized fluid system 12 includes a pressurized fluid 14, a pressurizing device 16 for pressurizing pressurized fluid 14, a pressure sink 18, and a valve assembly 20. Pressurized fluid 14 may be air, a gas, or a liquid. Pressurizing device 16 may be a pump, a compressor, a pressurized accumulator or storage tank, or any pressurization system or pressure source. Pressure sink 18 may be a low pressure portion of pressurized fluid system 12, a return line to pressurizing device 16, an environmental control system, an anti-icing system, an inflatable device, a fuel tank, a vent, an actuating device, a device for performing work with a fluid, a chamber, or any accoutrement having pressure lower than the pressure of pressurized fluid 14 at pressurizing device 16.

Valve assembly 20 is used for controlling a discharge 22 of pressurized fluid 14 to pressure sink 18.

Figure 2:
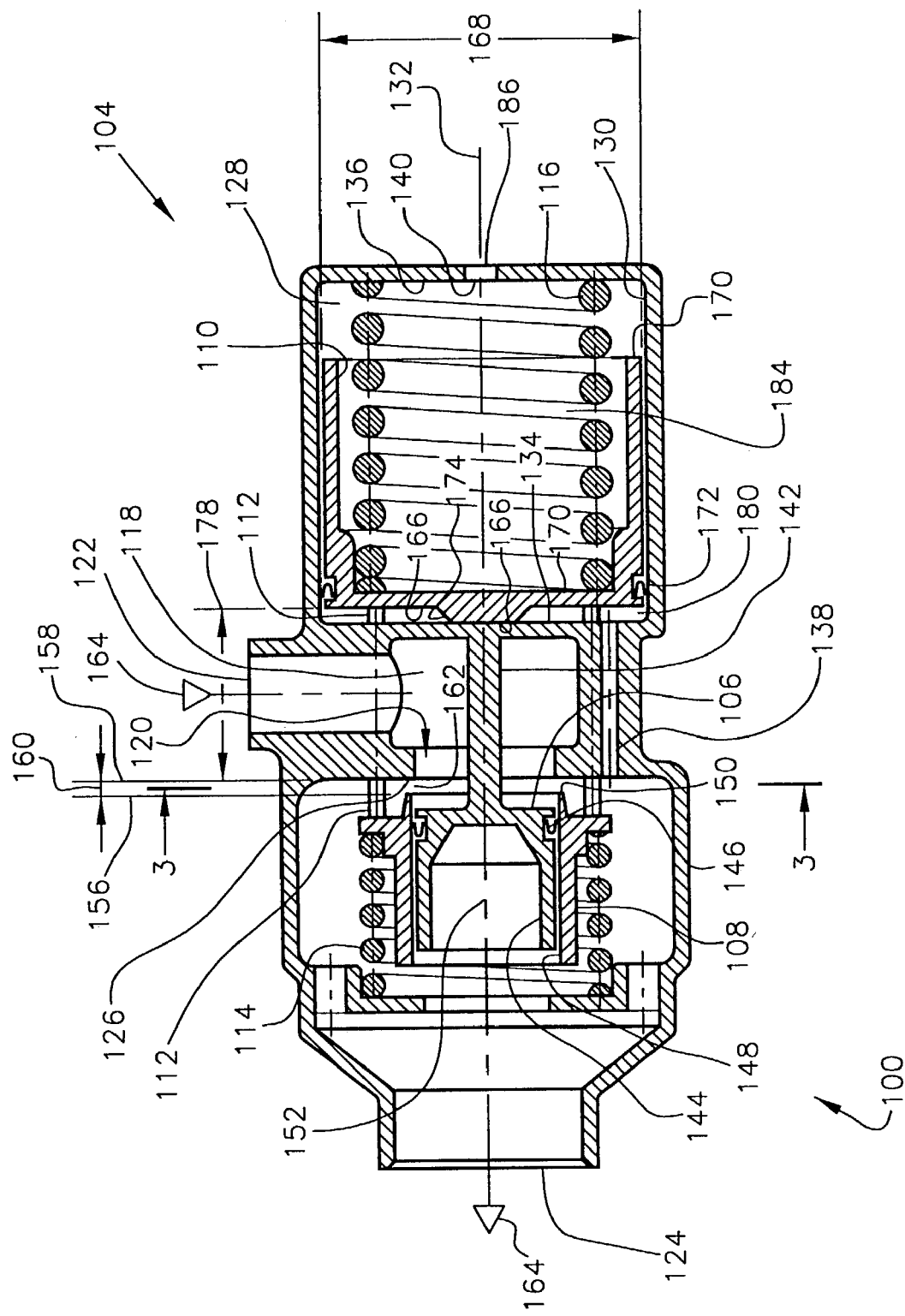
FIG. 2 is a cross sectional view of an embodiment of the present invention, featuring a poppet having essentially zero effective surface area exposed to pressure at the inlet port, with the valve assembly shown in the open position.

Referring to FIG. 2, in one embodiment, there is shown a valve assembly 100, suitable for use as valve assembly 20. Valve assembly 100 includes a valve body 104, an isolator 106, a poppet 108, a piston 110, at least one poppet shaft 112, a poppet spring 114, and a piston spring 116. The materials used in the manufacture of valve assembly 100, including the aforementioned components, are typically high strength nickel-based or iron-based steel alloys, titanium alloys, or aluminum alloys, but may also be made from other metal alloys, polymeric or composite materials, or other materials, depending upon the particular local ambient temperature and pressure requirements, the composition and temperature and pressure range of the pressurized fluid 14, and other design factors typically associated with aerospace systems. Additional mechanical and electrical design considerations may include cyclic durability, vibration, shock load, gyro load, sand and dust ingestion, fire proof, fungus growth, power input, explosion proof, electromagnetic interference, electrical bonding, radio frequency interference, and lightning susceptibility requirements for certification or qualification of valve assembly 100 for use on the particular aerospace vehicle 10 application.

Valve body 104 is configured to define a chamber 118 forming a primary flowpath 120 between an inlet port 122 and a discharge port 124. Valve body 104 includes a valve seat 126 disposed in primary flowpath 120 between inlet port 122 and discharge port 124. Formed in valve body 104 is a piston cavity 128. Piston cavity 128 is defined by a piston bore 130 having a piston bore axis 132, a head 134, a floor 136 opposite head 134, a pressurizing aperture 138, and a vent passage 140.

Figure 3:
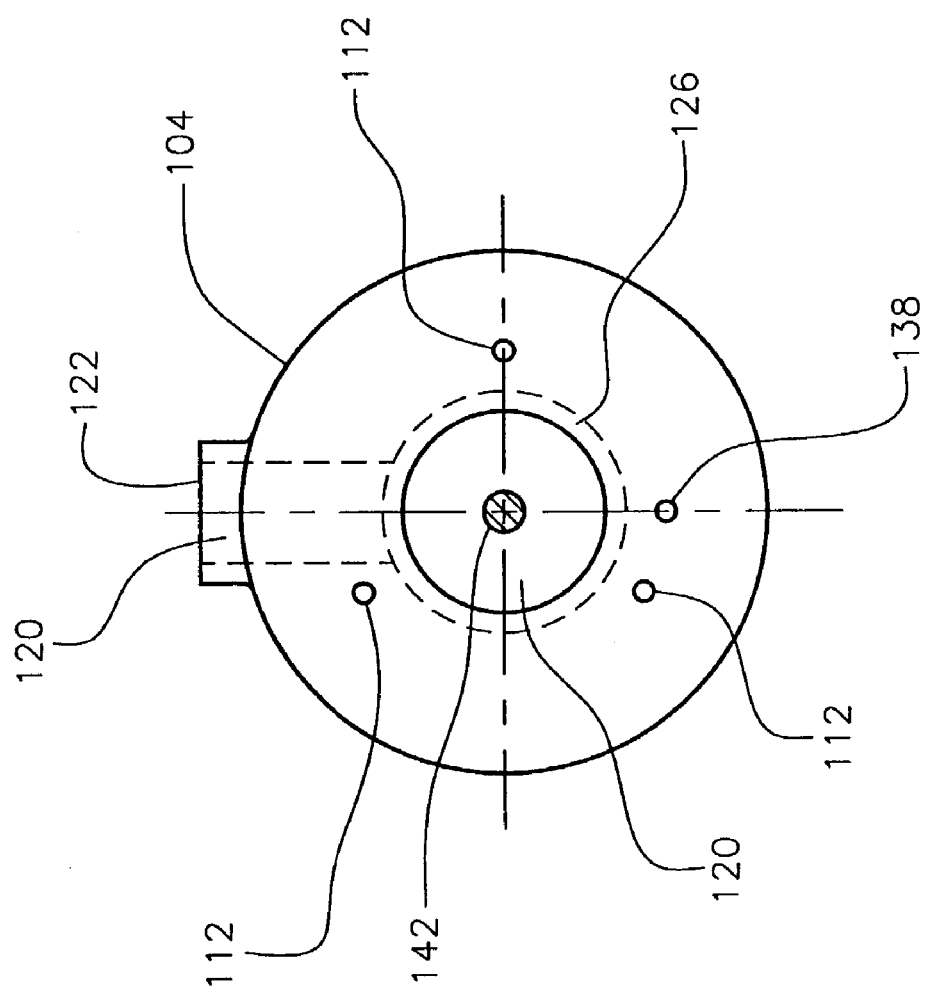
FIG. 3 is a sectional view of the valve body of the embodiment of FIG. 2 taken at section arrows 3—3, depicting passages providing fluid communication between a discharge port and a piston cavity, and illustrating three poppet shafts.

Referring now to FIG. 3 in conjunction with FIG. 2, valve seat 126 is depicted in the form of a flat circular portion of valve body 104 through which primary flowpath 120 extends. However, valve seat 126 may be of any shape suitable for sealing, including conical, frusto-conical, spherical, annular, or other shape consistent with the design of valve assembly 100 and valve body 104. In the embodiment shown, valve seat 126 is formed integral with valve body 104, and is machined, and ground and/or lapped to provide a smooth sealing surface. However, valve seat 126 may also take the form of an insert affixed to valve body 104. If valve seat 126 is in the form of an insert, valve seat 126 may be made of metal, a polymer, such as flourosilicone or other polymers, a composite, or any appropriate material, depending upon the aforementioned and other design parameters, cost, and ease of manufacture and assembly.

Referring again to FIG. 2, Isolator 106 is defined by a stem 142 and a skirt 144, and is disposed inside chamber 118. Skirt 144 includes a skirt seal 146. Stem 142 is rigidly coupled to valve body 104, and skirt 144 is affixed to stem 142. Stem 142 supports skirt 144 to prevent motion of skirt 144 relative to valve body 104. In FIG. 2, stem 142 is depicted as a solid body, however, it must be understood that stem 142 may be hollow structure capable of, for example, of transmitting fluid pressure via an aperture and an internal passageway, and/or capable of slidably receiving a shaft, such as poppet shaft 112, and/or a bearing.

Poppet 108 is disposed inside chamber 118, and has a bore 148 and a poppet seal 150. As illustrated in FIG. 2, poppet seal 150 is facing valve seat 126, and bore 148 extends along a centerline axis 152 of poppet 108 from poppet seal 150 in a direction away from valve seat 126. Centerline axis 152 and piston bore axis 132 are coincident with each other. In the embodiment exemplified in FIG. 2, centerline axis 152 is perpendicular to the plane of valve seat 126, although other orientations are possible. The depicted orientation is not to be construed as limiting the present invention.

In the embodiment of FIG. 2, poppet seal 150 is configured as a knife seal, having a hard surface and providing approximately a circular line contact with valve seat 126 when poppet seal 150 is engaged against valve seat 126. It must be understood that poppet seal 150 is not limited to being a knife seal, but may be any appropriate configuration for sealing in conjunction with valve seat 126.

As depicted in FIG. 2, poppet 108 with poppet seal 150 has essentially zero effective surface area exposed to pressurized fluid 14 from inlet port 122, thus rendering valve assembly 100 inlet pressure balanced. In other words, the operation of valve assembly 100 is independent of the pressure of pressurized fluid 14 at inlet port 122 because poppet 108 has essentially zero surface area facing along centerline axis 152 to be acted upon by pressurized fluid 14 flowing towards poppet 108 from inlet port 122.

Poppet 108 is slidably received over skirt 144 via bore 148, wherein skirt 144 of isolator 106 is configured to guide poppet 108 relative to valve body 104 and valve seat 126, retaining poppet seal 150 and poppet 108 in alignment with valve seat 126. Skirt seal 146 acts against bore 148 for sealing against bore 148. As may be appreciated by one skilled in the art, skirt seal 146 may also be in the form of any seal device for sealing a leakage flow between skirt 144 and bore 148, including an o-ring, a cap seal, a piston ring assembly, a close dimensional fit between skirt 144 and bore 148, or other seal devices, depending upon the design parameters for the particular application of valve assembly 100. Skirt 144 of isolator 106 is configured to shield bore 148 and isolate poppet 108 from substantially all of a dynamic pressure component of pressurized fluid 14 when pressurized fluid 14 flows from inlet port 122 past a portion of poppet 108 and then through discharge port 124 into pressure sink 18.

Poppet 108 is movable between a first position 156 and a second position 158, with first position 156 and second position 158 defining a stroke 160 of poppet 108 along centerline axis 152. Poppet 108 is configured such that if poppet 108 is between first position 156 and second position 158, poppet seal 150 and valve seat 126 define an annular flow area 162 configured to regulate a flow 164 of pressurized fluid 14 through primary flowpath 120 from inlet port 122 through annular flow area 162 to discharge port 124.

For example, if poppet 108 is at first position 156, annular flow area 162 is a maximum of annular flow area 162 and defines a maximum of flow 164 of pressurized fluid 14 through valve assembly 100. If poppet 108 is at second position 158, annular flow area 162 is reduced, with poppet seal 150 cooperating with valve seat 126 to reduce flow 164 of pressurized fluid 14 through primary flowpath 120 from inlet port 122 through annular flow area 162 to discharge port 124. To completely thwart flow 164, valve assembly 100 is designed such that, if poppet 108 is at second position 158, annular flow area 162 is zero, with poppet seal 150 engaging and cooperating with valve seat 126 to prevent flow 164 of pressurized fluid 14 through primary flowpath 120 from inlet port 122 through annular flow area 162 to discharge port 124.

Piston 110 has face surfaces 166, a piston diameter 168, tail surfaces 170, and includes a piston seal 172. Face surfaces 166 includes a piston stop 174 for limiting the motion of piston 110, and for allowing free circulation of pressurized fluid 14 around face surfaces 166 to act on face surfaces 166. Piston diameter 168 of piston 110 is slidably received in piston bore 130. Piston seal 172 is configured to seal a leakage flow between piston 110 and piston bore 130. In the embodiment shown in FIG. 2, piston seal 172 is depicted as a low friction lip seal. However, piston seal 172 may be any seal device for sealing a leakage flow between piston 110 and piston bore 130, including an o-ring, a cap seal, a piston ring assembly, a close dimensional fit between piston 110 and piston bore 130, or other seal devices, depending upon the design parameters for the particular application of valve assembly 100. As may be appreciated by one skilled in the art, piston 110 may also be in the form of a bellows, a diaphragm, or any device suitable for being acted upon by pressure to impart force or motion to another member.

Poppet shaft 112 includes a length 178. Poppet shaft 112 is slidably received in valve body 104, and is disposed between piston 110 and poppet 108, for transferring the force or displacement of piston 110 to poppet 108 in order to move poppet 108 along stroke 160 towards either first position 156 or second position 158, as well as transferring any force of poppet 108 to piston 110. In the embodiment of FIG. 3, three poppet shafts 112 are depicted, although a single poppet shaft 112 may be used. Poppet shaft 112 may be rigidly affixed to poppet 108 and/or piston 110, or may be retained in place between poppet 108 and piston 110 by the urging of springs, such as poppet spring 114 and piston spring 116, as in the embodiment of FIG. 2.

Poppet spring 114 is disposed between valve body 104 and poppet 108, for urging poppet 108 towards one of first position 156 and second position 158. In the embodiment of FIG. 2, poppet spring 114 urges poppet 108 in a direction towards first position 156. The urging of poppet spring 114 is transferred through poppet shaft 112 to piston 110.

Piston spring 116 is disposed between piston 110 and valve body 104, for urging piston 110 in a direction toward poppet 108 or away from poppet 108. In the embodiment of FIG. 2, piston spring 116 urges piston 110 in a direction towards poppet 108. The urging of piston spring 116 is transferred through poppet shaft 112 to poppet 108.

Length 178 of poppet shaft 112 keeps a minimum distance between poppet 108 and piston 110 with respect to piston bore axis 132 and centerline axis 152.

Piston cavity 128 and piston 110 form an active chamber 180 defined by face surfaces 166, piston bore 130, head 134, and pressurizing aperture 138.

Pressurizing aperture 138 is in fluid communication with discharge port 124 to define an actuating pressure in active chamber 180 acting upon face surfaces 166 of piston 110. The pressure at pressurizing aperture 138 is substantially the same as the pressure of discharge 22 at discharge port 124.

Piston cavity 128 and piston 110 also form a vent chamber 184 opposite piston 110 from active chamber 180. Vent chamber 184 is defined by tail surfaces 170 of piston 110, piston bore 130, floor 136, and vent passage 140. The size of vent chamber 184 within piston cavity 128 also depends upon the location of piston 110 within piston cavity 128, and the design of piston 110.

Vent passage 140 is in valuable fluid communication with a vent 186 to define a vent pressure in vent chamber 184 acting upon piston 110 oppositely than the actuating pressure acting upon piston 110. Vent 186 may be an ambient vent, a control pressure, a regulated pressure, pressure sink 18, a portion of pressurized fluid system 12 downstream of valve assembly 100, or some other pressure source suitable for use in controlling valve assembly 100.

A pilot valve may be used to provide valvability by selectively allowing or preventing vent passage 140 fluid communication with vent 186.

From FIG. 2, it is readily understood that vent pressure in vent chamber 184 acts on tail surfaces 170 of piston 110 to urge piston 110 in a direction away from floor 136, towards head 134, and in conjunction with the urging of piston spring 116, tends to remove poppet seal 150 away from valve seat 126, thereby opening up annular flow area 162. It is also readily understood that actuation pressure in active chamber 180 acts upon face surfaces 166 of piston 110, and in conjunction with the urging of poppet spring 114, tends to move poppet seal 150 towards valve seat 126, thereby reducing or closing annular flow area 162. Displacement of piston 110 is limited by piston stop 174 contacting head 134.

Because valve assembly 100 is inlet pressure balanced, the pressure of pressurized fluid 14 at inlet port 122 has no net effect on the position of poppet 108.

The operation of the present invention is now described with reference to the embodiment previously set forth. In describing the operation, it is assumed that the initial pressure of pressurized fluid 14 is at some nominal starting value, for example, ambient pressure, and that the pressure at discharge port 124 is also ambient pressure. Ambient pressure may be the ambient environmental pressure of the atmosphere in which valve assembly 100 is located, or may be any other reference pressure or other pressure. Because a pressure regulating valve is normally open, poppet 108 is at first position 156, and hence, annular flow area 162 is at the maximum of annular flow area 162. The operation of valve assembly 100 is initiated by increasing the pressure of pressurized fluid 14 at inlet port 122.

As the pressure of pressurized fluid 14 increases, flow 164 of pressurized fluid 14 begins through valve assembly 100 via inlet port 122 into primary flowpath 120, moving through annular flow area 162 around poppet 108, and then exits valve assembly 100 through discharge port 124 as discharge 22 into pressure sink 18. The velocity of flow 164 increases with increasing pressure of pressurized fluid 14, yielding a dynamic pressure component, otherwise known as a velocity head. The dynamic pressure component becomes very strong in the vicinity of poppet seal 150 and valve seat 126.

As flow 164 increases, pressure builds up in pressure sink 18 and at discharge port 124, defining an actuating pressure. The actuating pressure is communicated via pressurizing aperture 138 to active chamber 180, and acts upon face surfaces 166 of piston 110, tending to push piston 110 in conjunction with the urging of poppet spring 114, against the urging of piston spring 116. At the same time, vent pressure in vent chamber 184 is acting on tail surfaces 170 of piston 110, and in conjunction with the urging of piston spring 116, act in opposition to the urging of poppet spring 114 and the actuation pressure acting upon face surfaces 166 of piston 110. Accordingly, a combination of actuating pressure acting upon piston 110, and vent pressure acting oppositely upon piston 110 in conjunction with the urging of piston spring 116, yields a net force acting to cause a displacement of piston 110 along piston bore axis 132 in a direction away from head 134. Poppet 108 is urged by poppet spring 114 along poppet centerline axis 152 against poppet shafts 112, and, via poppet shafts 112, poppet 108 retains a distance of length 178 from piston 116. Poppet 108 is thus displaced along stroke 160 in a direction towards second position 158. Skirt 144 of isolator 106 guides the displacement of poppet 108 along centerline axis 152. The displacement of poppet 108 and piston 110 vary in relation to the magnitude of the actuating pressure with respect to the magnitude of vent pressure. Both the displacement direction and the displacement amount are also dependent upon poppet spring 114 and piston spring 116, which can be sized to alter the operating characteristics of valve assembly 100.

The displacement of poppet 108 reduces the distance between poppet seal 150 and valve seat 126, thus reducing annular flow area 162, and hence reducing the volume of flow 164 through valve assembly 100. As the pressure at pressure sink 18 continues to build up, actuating pressure increases accordingly, resulting in further displacement of poppet 108 towards second position 158, thus further reducing flow 164 though the valve assembly 100. Eventually, the pressure at pressure sink 18, hence the actuating pressure, reaches a design point of valve assembly 100, in which poppet 108 is displaced sufficiently to reach second position 158. At this point, poppet seal 150 is in engagement with valve seat 126, and annular flow area 162 is zero, thus preventing any additional flow 164 through valve assembly 100. Should the pressure at pressure sink 18 reduce, actuating pressure will reduce accordingly, allowing vent pressure acting on tail surfaces 170 of piston 110 and the urging of piston spring 116 to overcome actuating pressure and the urging of poppet spring 114 to displace piston 110 and poppet 108 towards first position 156, thereby allowing flow 164 through valve assembly 100.

Because poppet 108 has essentially zero effective surface area facing along centerline axis 152 exposed to pressurized fluid 14 flowing towards poppet 108 from inlet port 122, the pressure of pressurized fluid 14 does not act on poppet 108 to urge poppet 108 along centerline axis 152, and therefore does not affect the operation of valve assembly 100. Rather, it is only the combination of actuating pressure acting upon piston 110 and vent pressure acting oppositely upon piston 110, along with the respective urgings of poppet spring 114 and piston spring 116 that cause the operation of valve assembly 100. As may be appreciated by one skilled in the art, poppet 108 is able to have an essentially zero effective surface area exposed to pressurized fluid 14 from inlet port 122 because of the inclusion of isolator 108 into valve assembly 100.

The dynamic pressure components of flow 164 do not act on poppet 108 to act on or change a pressure distribution on an operative surface of poppet 108, since there are no such operative surfaces on poppet 108 facing along centerline axis 152. Instead, the dynamic pressure components impinge on skirt 144 of isolator 106, and poppet 108 is thus isolated from those dynamic pressure components. Thus, valve assembly 100 is not affected by the dynamic pressure components of flow 164, and hence is immune to the corresponding adverse effects, including unpredictable results or measurable inaccuracies in the regulation of pressure or flow through valve assembly 100, changes in the force balance internal to valve assembly 100, and hysteresis.

Figure 4:
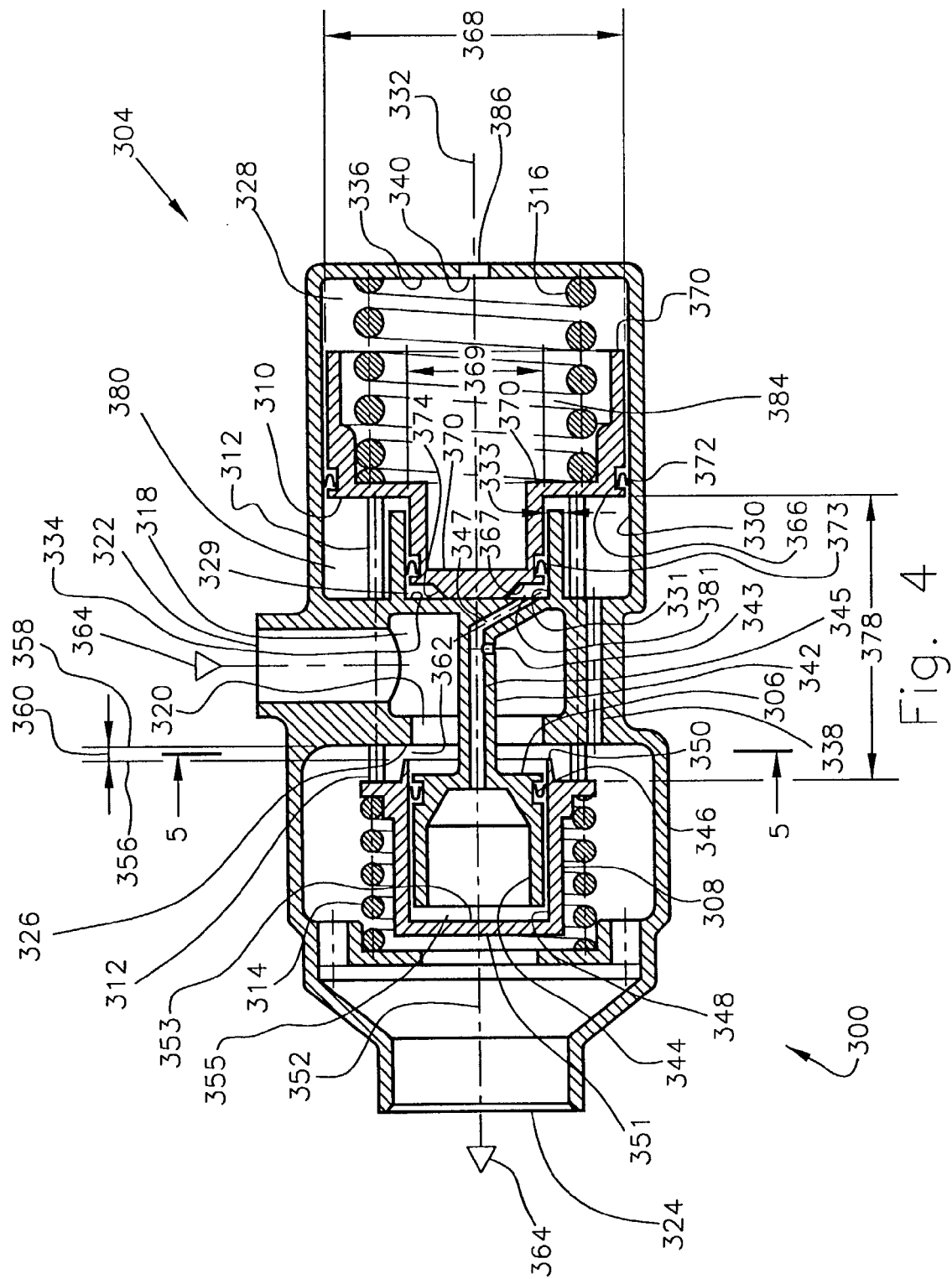
FIG. 4 is a cross sectional view of another embodiment of the present invention wherein the valve assembly is inlet pressure balanced by virtue of a poppet and balancing piston having the same effective surface area acted oppositely upon by pressurized fluid from the inlet port.

Referring now to FIG. 4, another embodiment showing a valve assembly 300, suitable for use as valve assembly 20, is depicted. Valve assembly 300 includes valve body 304, an isolator 306, a poppet 308, a piston 310, at least one poppet shaft 312, a poppet spring 314, and piston spring 316. The features, components, and construction of this embodiment are common with the previously described embodiment, as is seen in FIG. 4, except as described below. In addition, the materials used in valve assembly 300 are common with those previously described with regard to valve assembly 100.

Valve body 304 is configured to define a chamber 318 forming a primary flowpath 320 between an inlet port 322 and a discharge port 324. Valve body 304 includes a valve seat 326 disposed in primary flowpath 320 between inlet port 322 and discharge port 324. Formed in valve body 304 is a piston cavity 328 and a balancing cavity 329. Piston cavity 328 is defined by a piston bore 330 having a piston bore axis 332, a head 334, a floor 336 opposite head 334, a pressurizing aperture 338, and a vent passage 340. Balancing cavity 329 is defined by a balancing bore 331 having a wall thickness 333, and head 334. Balancing bore 331 is positioned about piston bore axis 332, and is joined with or is part of head 334.

Figure 5:
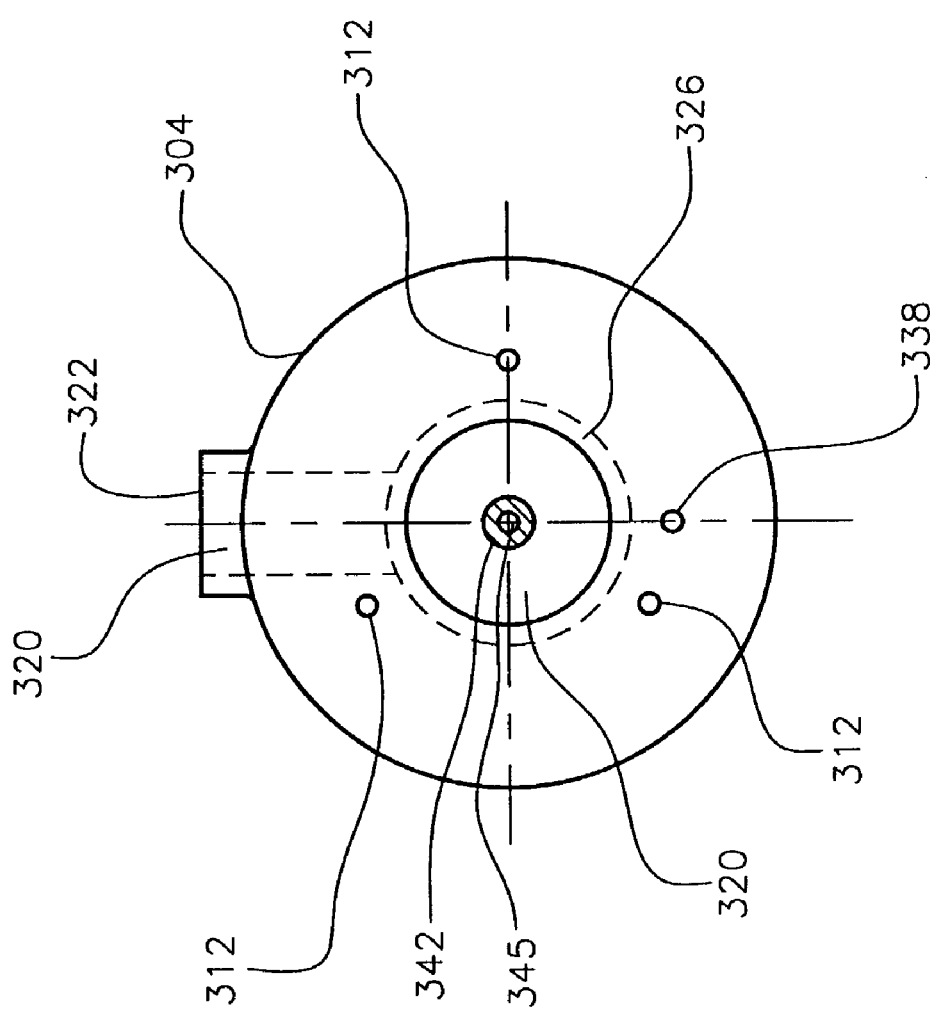
FIG. 5 is a sectional view of the valve body of the embodiment of FIG. 4 taken at section arrows 5—5, depicting passages providing fluid communication between a discharge port and a piston cavity, and illustrating three poppet shafts Corresponding reference characters indicate corresponding parts throughout the several views. The exemplifications set out herein illustrate at least one preferred embodiment of the invention, and such exemplifications are not to be construed as limiting the scope of the invention in any manner.

Referring now to FIG. 5 in conjunction with FIG. 4, valve seat 326 is in the form of a flat circular portion of valve body 304 through which primary flowpath 320 extends. Valve seat 326 is common with valve seat 126.

Referring again to FIG. 4, Isolator 306 is defined by a stem 342 and a skirt 344, and is disposed inside chamber 318. Skirt 344 includes a skirt seal 346. Stem 342 includes a charging aperture 343, a charging passage 345, and a balancing passage 347. Stem 342 is rigidly coupled to valve body 304, and skirt 344 is affixed to stem 342. Stem 342 supports skirt 344 to prevent motion of skirt,344 relative to valve body 304.

Charging aperture 343 is in fluid communication with inlet port 322 via primary flowpath 320, and charging passage 345 and balancing passage 347 are in fluid communication with charging aperture 343. Balancing passage 347 passes through head 334, thereby exposing balancing cavity 329 to fluid communication with inlet port 322.

Poppet 308 is disposed inside chamber 318, and has a bore 348, a poppet seal 350, and a cap 351 with a cap area 353. As illustrated in FIG. 2, poppet seal 350 is facing valve seat 326, and bore 348 extends along a centerline axis 352 of poppet 308 from poppet seal 350 in a direction away from valve seat 326. Cap 351 is located on poppet 308 opposite poppet seal 350, with cap area 353 facing valve seat 326. Centerline axis 352 and piston bore axis 332 are coincident with each other. In the embodiment exemplified in FIG. 4, centerline axis 352 is arranged relative to valve seat 326 similar to the arrangement of centerline axis 152 relative to valve seat 126.

Poppet 308 is slidably received over skirt 344 via bore 348, wherein skirt 344 of isolator 306 is configured to guide poppet 308 relative to valve body 304 and valve seat 326, retaining poppet seal 350 and poppet 308 in alignment with valve seat 326. Skirt seal 346 acts against bore 348 for sealing against bore 348. As may be appreciated by one skilled in the art, skirt seal 346 may be in the form of any seal device for sealing a leakage flow between skirt 344 and bore 348, including an o-ring, a cap seal, a piston ring assembly, a diametral clearance between skirt 144 and bore 148 sized as necessary for operation of valve assembly 300, or other seal devices, depending upon the design parameters for the particular application of valve assembly 300. Skirt 344 of isolator 306 is configured to shield bore 348 and isolate poppet 308, including cap area 353 of cap 351 from substantially all of a dynamic pressure component of pressurized fluid 14 when pressurized fluid 14 flows from inlet port 322 past a portion of poppet 308 and then through discharge port 324 into pressure sink 18. As may be appreciated by one skilled in the art, poppet 308 may also be in the form of a bellows, a diaphragm, or any device suitable for being acted upon by pressure to impart force or motion to another member.

In the embodiment of FIG. 4, poppet seal 350 is configured as a knife seal, having a hard surface and providing approximately a circular line contact with valve seat 326 when poppet seal 350 is engaged against valve seat 326. Poppet seal 350 is the same as poppet seal 150.

Skirt 344 of isolator 306 and poppet 308 form a poppet chamber 355 that is exposed to pressurized fluid 14 via inlet port 322, charging aperture 343 and charging passage 345, and allows pressurized fluid 14 into poppet chamber 355 to act on cap area 353 of cap 351 of poppet 308 to urge poppet 308 along centerline axis 352 against poppet spring 314 in a direction away from valve seat 326, and in the same direction as piston spring 316.

Poppet 308 is movable between a first position 356 and a second position 358, with first position 356 and second position 358 defining a stroke 360 of poppet 308 along centerline axis 352. Poppet 308 is configured such that if poppet 308 is between first position 356 and second position 358, poppet seal 350 and valve seat 326 define an annular flow area 362 configured to regulate a flow 364 of pressurized fluid 14 through primary flowpath 320 from inlet port 322 through annular flow area 362 to discharge port 324. The regulation of flow by poppet 308 is similar to that previously described with respect to poppet 108.

Piston 310 has face surfaces 366, a balancing face 367, a piston diameter 368, a balancing diameter 369, tail surfaces 370, and includes a piston seal 372 and a balancing seal 373. Balancing face 367?includes a piston stop 374 for limiting the motion of piston 310, and for allowing free circulation of pressurized fluid 14 around balancing face 367 to act on balancing face 367. Piston diameter 368 of piston 310 is slidably received in piston bore 330, and balancing diameter 369 is slidably received in balancing bore 331. Balancing face 367 has the same surface area as cap area 353. As with, piston 310 may also be in the form of a bellows, a diaphragm, or any device suitable for being acted upon by pressure to impart force or motion to another member.

Piston seal 372 is configured to seal a leakage flow between piston 310 and piston bore 330, and balancing seal 373 is configured to seal a leakage flow between balancing diameter 369 and balancing bore 331. As with piston seal 172, piston seal 372 and balancing seal 373 may be any seal device for sealing leakage flow, depending upon the design parameters for the particular application of valve assembly 300.

Poppet shaft 312 includes a length 378. Poppet shaft 312 and length 378 are similar in function and operation with poppet shaft 112 and length 178, except that poppet shaft 312 is affixed to both poppet 308 and piston 310, unlike the previously described embodiment.

Poppet spring 314 is disposed between valve body 304 and poppet 308, and functions the same as poppet spring 114, whereas piston spring 316 is disposed between piston 310 and valve body 304, and functions the same as poppet spring 116.

Piston cavity 328 and piston 310 form an active chamber 380 defined by face surfaces 366, piston bore 330, head 334, balancing bore 331 with wall thickness 333, and pressurizing aperture 338.

Pressurizing aperture 338 is in fluid communication with discharge port 324 to define an actuating pressure in active chamber 380 acting upon face surfaces 366 of piston 310. The pressure at pressurizing aperture 338 is substantially the same as the pressure of discharge 22 at discharge port 324.

Balancing cavity 329 and piston 310 form a balancing chamber 381 defined by balancing face 367, balancing bore 331, head 334, and balancing passage 347.

As depicted in FIG. 4, each of cap area 353 and balancing face 367 are oppositely exposed to pressurized fluid 14 from inlet port 322 and since balancing face 367 has the same surface area as cap area 353, valve assembly 300 is rendered to be inlet pressure balanced. Thus, the operation of valve assembly 300 is independent of the pressure of pressurized fluid 14 at inlet port 322. Poppet shafts 312 retain poppet 308 and piston 310 relative to each other, so that poppet 308 and piston 310 may only move or be displaced as a unit.

Piston cavity 328 and piston 310 also form a vent chamber 384 opposite piston 310 from active chamber 380. Vent chamber 384 is defined by tail surfaces 370 of piston 310, piston bore 330, floor 336, and vent passage 340.

Vent passage 340 is in valuable fluid communication with a vent 386 to define a vent pressure in vent chamber 384 acting upon piston 310, via tail surfaces 370, oppositely than the actuating pressure acting upon piston 310. Vent 386 serves the same function as vent 186.

A pilot valve may be used to provide valvability by selectively allowing or preventing vent passage 340 fluid communication with vent 386.

From FIG. 4, it is clear that vent pressure in vent chamber 384 acts on tail surfaces 370 of piston 310 to urge piston 310 in a direction away from floor 336, towards head 334, and in conjunction with the urging of piston spring 316, tends to remove poppet seal 350 away from valve seat 326, thereby opening up annular flow area 362. It is equally clear that actuation pressure in active chamber 380 acts upon piston 310, and in conjunction with the urging of poppet spring 314, tends to move poppet seal 350 towards valve seat 326, thereby reducing or closing annular flow area 362. Displacement of piston 310 is limited by piston stop 374 contacting head 134.

Because valve assembly 300 is inlet pressure balanced, the pressure of pressurized fluid 14 at inlet port 322 has no net effect on the position of poppet 308.

The operation of the present invention is now described with reference to the embodiment previously set forth. In describing the operation, it is assumed that the initial pressure of pressurized fluid 14 is at some nominal starting value, for example, ambient pressure, and that the pressure at discharge port 324 is also ambient pressure. Because a pressure regulating valve is normally open, poppet 308 is at first position 356, and hence, annular flow area 362, is at the maximum of annular flow area 362. The operation of valve assembly 300 is initiated by increasing the pressure of pressurized fluid 14 at inlet port 322.

As the pressure of pressurized fluid 14 increases, flow 364 of pressurized fluid 14 begins through valve assembly 300 via inlet port 322 into primary flowpath 320, moving through annular flow area 362 around poppet 308, and then exits valve assembly 300 through discharge port 324 as discharge 22 into pressure sink 18. Some of flow 364 of pressurized fluid 14 enters charging aperture 343 of isolator 306, and flows therefrom through charging passage 345 into poppet chamber 355, and some flows from charging aperture 343 through balancing passage 347 into balancing chamber 381. The pressure inside poppet chamber 355 acts on cap area 353 of poppet 308, while the pressure inside balancing chamber acts on balancing face 367. By virtue of the fluid communication between poppet chamber 355 and balancing chamber 381 via charging passage 345 and balancing passage 347, the pressure inside poppet chamber 355 and balancing chamber 381 is the same. Because balancing face 367 of piston 310 has the same surface area as cap area 353 of poppet 308 exposed to pressurized fluid 14 from inlet port 322, balancing face 367 and cap area 353 are exposed to pressurized fluid 14 in opposite directions, and poppet 308 is retained to piston 310 via affixed poppet shafts 312, the pressure of pressurized fluid 14 from inlet port 322 will not urge the system of poppet 308, poppet shafts 312, and piston 310 in any direction, and thus has no effect on the operation of valve assembly 300. Hence valve assembly 300 is inlet pressure balanced., As with valve assembly 100, as the velocity of flow 364 increases with increasing pressure of pressurized fluid 14, and yields a dynamic pressure component, which becomes very strong in the vicinity of poppet seal 350 and valve seat 326.

As flow 364 increases, pressure builds up in pressure sink 18 and at discharge port 324, defining an actuating pressure. The actuating pressure is communicated via pressurizing aperture 338 to active chamber 380, and acts upon face surfaces 366 of piston 310, tending to push piston 310 in conjunction with the urging of poppet spring 314, against the urging of piston spring 316. At the same time, vent pressure in vent chamber 384 is acting on tail surfaces 370 of piston 310, and in conjunction with the urging of piston spring 316, acts in opposition to the urging of poppet spring 314 and the actuation pressure acting upon face surfaces 366 of piston 310. Accordingly, a combination of actuating pressure acting upon piston 310 and vent pressure acting oppositely upon piston 310 yields a net force acting to cause a displacement of piston 310 along piston bore axis 332 in a direction away from head 334. The displacement of piston 310 is transferred to poppet 308 via poppet shafts 312, with poppet 310 retain a distance of length 178 from piston 116. Poppet 308 is thus displaced along stroke 360 in a direction towards second position 358. Skirt 344 of isolator 306 guides the displacement of poppet 308 along centerline axis 352. The displacement of poppet 308 and piston 310 vary in relation to the magnitude of the actuating pressure with respect to the magnitude of vent pressure. Both the displacement direction and the displacement amount are also dependent upon poppet spring 314 and piston spring 316, which can be sized to alter the operating characteristics of valve assembly 300. Because valve assembly 300 is pressure balanced by virtue of cap area 353 being oppositely exposed to the same pressure of pressurizing fluid 14 as balancing face 367, changes in actuating pressure have no effect on the operation of valve assembly 300.

The displacement of poppet 308 reduces the distance between poppet seal 350 and valve seat 326, thus reducing annular flow area 362, and hence reducing the volume of flow 364 through valve assembly 300. As the pressure at pressure sink 18 continues to build up, actuating pressure increases accordingly, causing further displacement of poppet 308 towards second position 358, thus further reducing flow 364 though the valve assembly 300. Eventually, the pressure at pressure sink 18, hence the actuating pressure, reaches a design point of valve assembly 300, in which poppet 308 is displaced sufficiently to reach second position 358. At this point, poppet seal 350 is in engagement with valve seat 326, and annular flow area 362 is zero, thus preventing any additional flow 364 through valve assembly 300. Should the pressure at pressure sink 18 reduce, actuating pressure will reduce accordingly, eventually allowing vent pressure acting on tail surfaces 370 of piston 310 and the urging of piston spring 316 to displace piston 310 and poppet 308 towards first position 356, thereby allowing flow 364 through valve assembly 300.

The dynamic pressure components of flow 364 do not act on poppet 308 to act on or change a pressure distribution on the operative surface i.e., cap area 353, of poppet 308, since skirt 344 shields bore 348, and isolates poppet 308 from substantially all of the dynamic pressure components of flow 384 of pressurized fluid 14. Instead, the dynamic pressure components impinge on skirt 344 of isolator 306. Thus, valve assembly 300 is not affected by the dynamic pressure components of flow 364, and hence is immune to the corresponding adverse effects, including unpredictable results or measurable inaccuracies in the regulation of pressure or flow through valve assembly 300, and changes in the force balance internal to valve assembly 300, causing hysteresis.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A valve assembly for controlling a discharge of a pressurized fluid, said valve assembly comprising:
    a valve body configured to define a chamber forming a primary flowpath between an inlet port and a discharge port, said valve body including a valve seat disposed in said primary flowpath between said inlet port and said discharge port;
    an isolator defined by a skirt and a stem, said isolator disposed inside said chamber, said stem coupled to said valve body, said skirt affixed to said stem, said skirt including a skirt seal for sealing against said bore, and said isolator further including a charging aperture and a charging passage, said charging aperture being in fluid communication with said inlet port, said charging passage being in fluid communication with said charging aperture; and
    a poppet having a bore, said poppet being disposed inside said chamber, said poppet being slidably received over said skirt via said bore, said poppet further having a poppet seal facing said valve seat, said bore extending along a centerline axis of said poppet from said poppet seal away from said valve seat, said poppet being movable between a first position along said centerline axis and a second position along said centerline axis, said first position and said second position defining a stroke of said poppet along said centerline axis, and said poppet further including a cap having a cap area,
    wherein said isolator is configured to guide said poppet relative to said valve body, said skirt configured to shield said bore and isolate said poppet from substantially all of a dynamic pressure component of said pressurized fluid when said pressurized fluid flows from said inlet port past a portion of said poppet and then through said discharge port; and
    wherein said skirt and said poppet form a poppet chamber exposed to said pressurized fluid via said inlet port, said charging aperture, and said charging passage, for allowing said pressurized fluid to act upon said cap area of said cap of said poppet to urge said poppet along said centerline axis.

2. The valve assembly of claim 1, wherein said poppet has an essentially zero effective surface area exposed to said pressurized fluid from said inlet port.

3. The valve assembly of claim 1, further comprising a piston coupled to said poppet, said piston having a balancing face, wherein each said cap area and said balancing face are oppositely exposed to said pressurized fluid from said inlet port, thereby rendering said valve assembly to be inlet pressure balanced.

4. The valve assembly of claim 1 wherein said valve assembly is inlet pressure balanced.

5. A pressurized fluid system comprising:
    a pressurized fluid;
    a pressurizing device for pressurizing said pressurized fluid;
    a pressure sink, said pressure sink having a sink pressure lower than a pressure of said pressurized fluid;
    a valve assembly for controlling a discharge of said pressurized fluid to said pressure sink, said valve assembly including:
    a valve body configured to define a chamber forming a primary flowpath between an inlet port and a discharge port, said valve body including a valve seat disposed in said primary flowpath between said inlet port and said discharge port;
    an isolator defined by a skirt and a stem, said isolator disposed inside said chamber, said stem coupled to said valve body, said skirt affixed to said stem, said skirt including a skirt seal for sealing against said bore; and said isolator further including a charging aperture and a charging passage, said charging aperture being in fluid communication with said inlet port, said charging passage being in fluid communication with said charging aperture; and
    a poppet having a bore, said poppet being disposed inside said chamber, said poppet being slidably received over said skirt via said bore, said poppet further having a poppet seal facing said valve seat, wherein said bore extends along a centerline axis of said poppet from said poppet seal away from said valve seat, said poppet being movable between a first position and a second position, said first position and said second position defining a stroke of said poppet along said centerline axis, and said poppet further including a cap having a cap area,
    wherein said isolator is configured to guide said poppet relative to said valve body, said skirt configured to shield said bore and isolate said poppet from substantially all of a dynamic pressure component of said pressurized fluid when said pressurized fluid flows from said inlet port past a portion of said poppet and then through said discharge port into said pressure sink; and
    wherein said skirt and said poppet form a poppet chamber exposed to said pressurized fluid via said inlet port, said charging aperture, and said charging passage, for allowing said pressurized fluid to act upon said cap area of said cap of said poppet to urge said poppet along said centerline axis.

6. The pressurized fluid system of claim 5, wherein said poppet has an essentially zero effective surface area exposed to said pressurized fluid from said inlet port.

7. The pressurized fluid system of claim 5, further comprising a piston coupled to said poppet, said piston having a balancing face, wherein each said cap area and said balancing face are oppositely exposed to said pressurized fluid from said inlet port, thereby rendering said valve assembly to be inlet pressure balanced.

8. The pressurized fluid system of claim 5, wherein said valve assembly is inlet pressure balanced.

* * * * *